United States Patent
Nguyen-Nhu

(10) Patent No.: US 6,452,660 B1
(45) Date of Patent: Sep. 17, 2002

(54) MOTION PICTURE CAMERA AND CASSETTE SYSTEM

(75) Inventor: Anh Nguyen-Nhu, Unterschleissheim (DE)

(73) Assignee: Arnold & Richter Cine Technik GmbH & Co Betriebs KG, Munich (DE)

( * ) Notice: Subject to any disclaimer, the term of this patent is extended or adjusted under 35 U.S.C. 154(b) by 0 days.

(21) Appl. No.: 09/582,174
(22) PCT Filed: Dec. 22, 1998
(86) PCT No.: PCT/DE98/03799
§ 371 (c)(1), (2), (4) Date: Jun. 21, 2000
(87) PCT Pub. No.: WO99/34253
PCT Pub. Date: Jul. 8, 1999

(30) Foreign Application Priority Data

Dec. 23, 1997 (DE) .......................... 197 58 396

(51) Int. Cl.$^7$ ................................ G03B 23/02
(52) U.S. Cl. .............. 352/72; 352/78 R; 352/78 C
(58) Field of Search .............. 352/72, 73, 78 R, 352/78 C; 396/207, 208, 511, 512, 567; 355/40

(56) References Cited

U.S. PATENT DOCUMENTS

| | | | |
|---|---|---|---|
| 3,918,802 A | 11/1975 | Sakaguchi et al. ............ 352/72 |
| 4,576,455 A * | 3/1986 | Fazekas ..................... 352/78 R |
| 4,627,695 A | 12/1986 | Beauviala et al. ............. 352/72 |
| 4,806,958 A * | 2/1989 | Momot et al. ............... 396/208 |
| 4,806,960 A * | 2/1989 | Momot et al. ............... 396/208 |
| 5,347,645 A * | 9/1994 | Perry ......................... 713/502 |
| 5,467,155 A | 11/1995 | Miyazaki et al. ........... 396/207 |
| 5,572,271 A * | 11/1996 | Pelican ....................... 396/512 |
| 5,809,358 A * | 9/1998 | Weber ........................ 396/511 |
| 5,929,974 A * | 7/1999 | Inuiya ......................... 355/32 |
| 6,147,744 A * | 11/2000 | Smart et al. ................. 355/40 |

FOREIGN PATENT DOCUMENTS

EP  0 627 652  12/1994

* cited by examiner

Primary Examiner—Russell Adams
Assistant Examiner—Rodney E Fuller
(74) Attorney, Agent, or Firm—Christie, Parker & Hale, LLP

(57) ABSTRACT

A motion picture camera and cassette system is provided having at least one motion picture camera and several film cassettes containing an exposed and/or unexposed motion picture film. The film cassettes contain a storage device which stores at least the length of the exposed and/or unexposed motion picture film. The motion picture cameras have a device for exchanging data with the storage device of the film cassettes and sensing the exposed length of motion picture film. Changes in the exposed film length are transmitted by the data exchange device of the film camera to the storage device of the film cassettes.

14 Claims, 2 Drawing Sheets

MOTION PICTURE CAMERA AND CASSETTE SYSTEM

BACKGROUND

The present invention relates to a system for detecting, exchanging and storing data in a motion picture camera cassette.

U.S. Pat. No. 4,627,695 discloses a motion picture camera cassette system which has automatic measurement and display of exposed and unexposed film in one of a plurality of exchangeable film cassettes which can be connected to the camera body of a motion picture camera. For this purpose, each film cassette has for identification purposes a cassette code which is assigned exclusively to this film cassette. The motion picture camera has a device for reading and identifying the cassette codes, and a memory with a plurality of memory areas each of which are assigned to an individual film cassette, and which stores the length of the exposed or unexposed film in the film cassette which is assigned to the memory area. In addition, the motion picture camera has a microprocessor that receives the cassette identification signals and to which measuring pulses are fed which are output by a pulse generator connected to the film motor for each film image running through the film gate of the motion picture camera.

In this known motion picture camera cassette system, the motion picture camera stores and varies the length of the exposed or unexposed film of a film cassette which only has an identification mark that is detected by the motion picture camera. This is disadvantageous because the number of the film cassettes which can be connected to the camera and can be identified by the camera depends on the length of the identification mark and on the size of the camera memory. The length of the identification mark in turn determines a corresponding number of markings on the film cassette and sensors for detecting the identification marks on the side of the motion picture camera.

A further disadvantage of the known motion picture camera cassette system is that the various film cassettes are respectively assigned to only one motion picture camera. If a specific film cassette is connected to another motion picture camera, either it is necessary for the data to be acquired in advance from the motion picture camera originally assigned to the relevant film cassette and input into the memory of the other motion picture camera, or to load the film cassette with an unexposed film of known length.

A further disadvantage of the known system is that it is possible to exchange data with a data-processing device used in film production only via a connection to the motion picture camera. In this case, cassette data, film data and production-specific data cannot be detected, stored and further processed, or can only be detected, stored and further processed with considerable outlay.

SUMMARY OF THE INVENTION

It is an object of the present invention to create a motion picture camera cassette system that permits the detection, storage and transmission of data between a plurality of motion picture cameras, film cassettes and data-processing device in any desired way and preferably via an individual data line.

The solution according to the invention permits data to be exchanged between an arbitrary number of film cassettes, with optionally differing motion picture cameras, and data-processing device, and permits data to be transmitted preferably via a single data line.

In addition to individual marking of the film cassettes and storage of the respectively exposed or unexposed film length of the relevant cassette, the memory device contained in each film cassette also permits further data of importance for film production, such as a production number, film type, film sequence, etc., to be input and stored.

By storing film data, cassette data and production-specific data in each film cassette, the data can optionally be input and displayed directly on the film cassette, on a motion picture camera or on a display of a data-processing device.

The electronic data-processing device serves, in particular, to process, document and display the data output by a motion picture camera or a film cassette, and can, for its part, transmit data, such as, for example, when loading a film cassette, the length of the inserted, unexposed motion picture film, into the storage device of the film cassette, the input of a production number both into a motion picture camera and into a film cassette connected to or separate from a motion picture camera.

The data is exchanged between motion picture camera, film cassette and electronic data-processing device preferably via an electrooptical or magnetic transmitting device or via an electric line connection. Only one data line is required for serial data transmission.

It is preferable to use as an interface on the motion picture camera an interface which is present there in any case, such as, for example, a time code interface, an interface for a video reflex monitor or the like.

BRIEF DESCRIPTION OF THE DRAWINGS

The idea on which the invention is based is to be explained in more detail with the aid of an exemplary embodiment illustrated in the drawing, in which.

DETAILED DESCRIPTION

Figure 1:
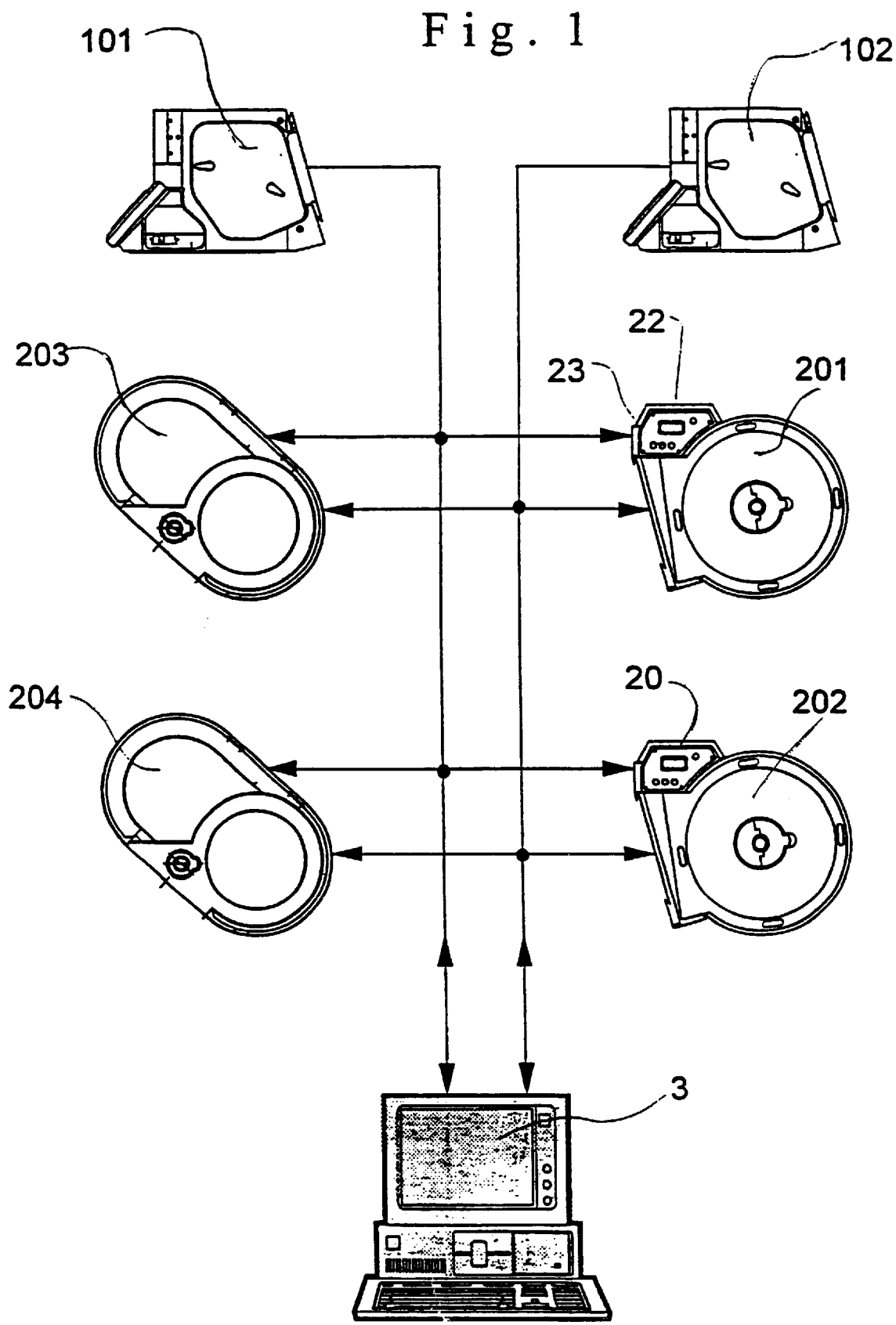
FIG. 1 is a schematic illustration of the connection of a plurality of film cassettes of different cassette types to two different motion picture cameras and an electronic data-processing device.

The connection diagram illustrated in FIG. 1 shows the camera body of two motion picture cameras 101, 102 with a camera mechanism, but without an explicit illustration of the shooting and viewfinder optics. A film transport mechanism contained in the camera mechanism is used to move a motion picture film intermittently along on a film gate, in which case during one film transport step a rotating mirror diaphragm or iris diaphragm covers the shooting beam path and uncovers the latter during the image position for film exposure. A film cassette which accommodates the exposed and unexposed motion picture film is to be fastened on the camera body of the motion picture camera 101, 102.

Because motion picture films of different light sensitivity are used in the course of film production and, depending on film sequence, a minimum length is required to carry out a "film take", a plurality of film cassettes with different film lengths and other film-specific data such as, for example, different manufacturers of the motion picture film, film types and the nature of the film (black and white film, colour negative film, colour reversal film), film sensitivities and the like are available during production. Moreover, various types of cassette, such as coaxial cassettes or single-chamber cassettes are also made available, depending on the wishes of the cameraman.

For these reasons, the motion picture cameras 101, 102 can be connected to various film cassettes 201 to 204, of which, for example, the coaxial cassettes 201 and 202 contain different lengths of unexposed films and optionally of different light sensitivity, or are provided for editing different film sequences. In the same way, various single-chamber cassettes 203, 204 are available which may likewise contain different lengths of unexposed and exposed film having, for example, different film sensitivity.

Each of these film cassettes 201–204 contains a storage device in which film data, cassette data and production-specific data can be stored. Film-specific data are, for example, the length of the exposed and/or unexposed film, film type, nature of the film and film sensitivity. These data may be displayed on the display 22 of a display and input device 20 of the film cassette 201–204 and be input and/or changed by an operator at an input keypad 23 of the film cassette 201–204. Such a display and input device 20 is, however, not mandatory. The single-chamber cassettes 203, 204 therefore do not have such a display and input device in the exemplary embodiment.

To exchange data, the motion picture cameras 101, 102 can be connected via a data line to the film cassettes 201–204 articulated on the camera body. Furthermore, the motion picture cameras 101, 102 and the various film cassettes 201–204 can be connected to an electronic data-processing device 3 for the purpose of exchanging data. Such a connection serves chiefly to document production-specific data. However, in the absence of a display and input device on the individual film cassettes 201 204, it can also be used to input data into the storage device of the individual film cassettes 201–204 and to display the data stored in the storage device of the film cassettes 201–204, just like the display and input devices of the motion picture cameras 101, 102.

The electronic data-processing device 3 can, furthermore, be used for the purpose of data exchange with the data stored in the motion picture cameras 101, 102, and for the purpose of logically combining and processing various items of data received from the motion picture cameras 101, 102 and the film cassettes 201–204.

Figure 2:
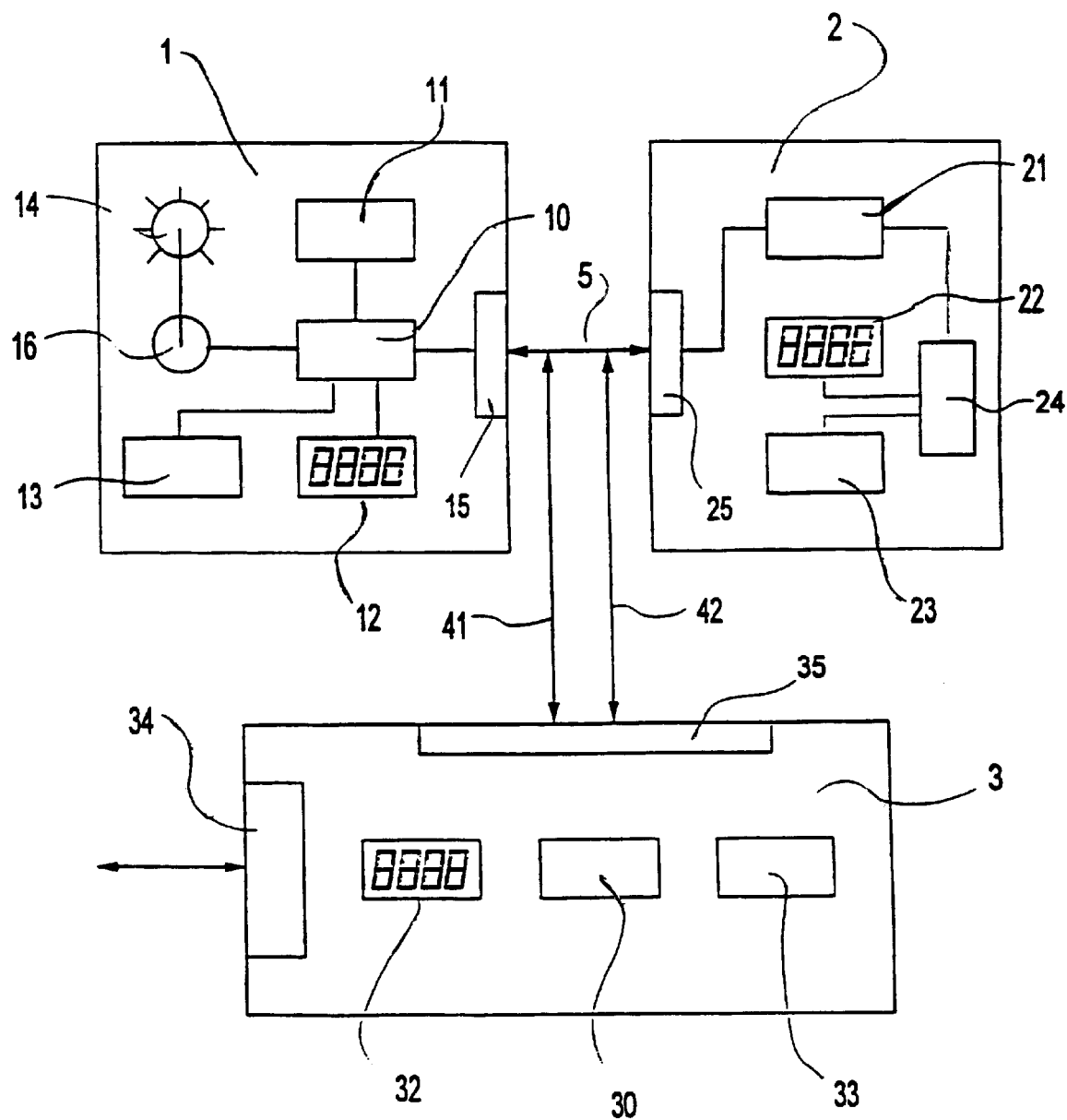
FIG. 2 is a block diagram of the data detection, storage and display devices in a motion picture camera, film cassette and electronic data-processing device.

The block diagram illustrated in FIG. 2 shows the internal structure of the camera-cassette system according to the invention for exchanging data between a motion picture camera 1, a film cassette 2 and/or an electronic data-processing device 3.

The motion picture camera 1 contains, in a manner known per se, a film feed mechanism 14 which is connected to a pulse generator 16 which in the case of intermittent film transport, for example, outputs a pulse to a microprocessor 10 with each transport of one film image. The microprocessor 10 is connected to a storage device 11, an input keypad 13 arranged on the motion picture camera and a display device 12. The microprocessor 10 is connected via an input/output port to a data-transmitting device or a camera interface 15 which is preferably arranged in the region where a film cassette is articulated on the camera body.

An exemplary film cassette 2 contains a storage device 21 in the form of an EEPROM, flash EEPROM, battery-backed RAM or the like. The storage device 21 is connected to a data-transmitting device or cassette interface 25 which communicates via a data line 5 with the camera interface 15. The data line 5 and the data-transmitting devices or interfaces 15, 25 of the motion picture camera 1 or the film cassette 2 may optionally be designed for optoelectronic or magnetic data transmission or for data transmission via a line connection.

In addition to the cassette interface 25 and the storage device 21, the film cassettes 2 provided with a dedicated input and display unit 20 have a cassette display 22 and an input keypad 23 that are connected to a microprocessor 24 to which the storage device 21 is also connected. Via the cassette display 22 and the input keypad 23, a user can input data into the storage device 21 of the film cassette 2 and access the data stored therein and display it on the cassette display 22. These additional elements 22, 23, 24 are optional, however. What is important to the invention is arranging a storage device 21 in connection with a interface 25 for exchanging data with the motion picture camera 1 and/or an electronic data-processing unit 3.

An exemplary electronic data-processing unit 3 contains a storage and arithmetic unit 30 for storing and processing data, an input keypad 33 and a display 32 for displaying data. Via an interface 35, the electronic data-processing device 3 can be connected to the interfaces 15, 25 of the motion picture camera 1 or film cassette 2 via data lines 41, 42. Via a further interface 34, bidirectional data traffic can be set up with further electronic data-processing devices.

The mode of operation of the camera-cassette system according to an embodiment of the present invention is described below with reference to FIGS. 1 and 2.

When inserting an unexposed motion picture film, for example in the film cassette 201, the length of the unexposed film and, if appropriate, the film type, the nature of the film, the film manufacturer and/or the production number are input at the input keypad 23. (Alternatively, lacking an input device 20 on the film cassettes 203 and 204, the length of the unexposed motion picture film can be input at the input keypad 13 of the motion picture camera 101 or 102 or, respectively, at the input keypad 33 of the electronic data-processing unit 3, and be transmitted into the memory 21 of the film cassettes 203, 204.)

While the film is being shot, the length of the unexposed motion picture film remaining in the film cassette 201 is continuously displayed, with the motion picture camera 101 rolling, in metres or feet on the display device 12 of the motion picture camera 101. In addition, or alternatively, the display of the unexposed film present in the cassette can be displayed on the display device 22 of the film cassette 201. The length of the exposed film is detected by means of the pulse generator 16, which is coupled to the film feed mechanism (film tooth sprocket) 14 and, with each exposed film image, outputs a pulse to the microprocessor 10 of the motion picture camera 101. The length of the exposed film is subtracted from the originally input length of the unexposed film, and the difference is displayed on the display device 12 of the motion picture camera 101.

As an alternative, or additionally, via the camera interface 15 and the data line 5, the length of the unexposed film can be stored continuously, via the cassette interface 25 in the storage device 21 of the film cassette 201 and be displayed on the display device 22.

After the film has been shot or a cassette has been exchanged, there is the further possibility of connecting the film cassette 201 to an appropriate adapter of an electronic data-processing device 3, and of transmitting the current data from the storage device 21 of the film cassette 201 into the electronic data-processing unit 3, where they are stored for the purposes of documentation and/or for monitoring the exposed or unexposed film lengths.

In the case of reverse running of the motion picture camera 101, the length of the motion picture film transported back is detected and likewise stored in the storage device 21 of the film cassette 201.

After removal of the film cassette 201 from the motion picture camera 101, a single-chamber cassette 203 can be articulated on the motion picture camera 101, which has no dedicated input and display device, like the film cassette 201. By inputting the unexposed film length inserted into the film cassette 203 at the input keypad 13 of the motion picture camera 101, the film length at the motion picture camera 101 is displayed and, if appropriate, it is possible to input further film data and production-specific data which are stored in the storage device 21 of the film cassette 203. Here, as well, the data is transmitted into the storage device 21 of the film cassette 203 via the camera processor 10 and the camera interface 15 via the data line 5 to the cassette interface 25.

While the camera is rolling, the length of the exposed film is detected in the way previously described via the pulse generator 16, coupled to the film feed mechanism 14, and the microprocessor 10 of the motion picture camera 101, and transmitted via the transmitting devices 15, 5, 25 into the storage device 21 of the film cassette 203 continuously or, for example, after termination of a shooting sequence.

The further coaxial cassette 202 and the single-chamber cassette 204 can be connected in the same, previously described way to the motion picture camera 101, and the length of the inserted, unexposed film can be input via the camera keypad 13 or the cassette keypad 23. Alternatively, before the film cassette 201 to 204 is connected to the motion picture camera 101, the length of the unexposed film can be input via the electronic data-processing unit 3 and be stored in the storage device 21 of the film cassettes 201–204, if appropriate with additional film data and production-specific data.

Because each film cassette 201–204 has a dedicated storage device 21, each of the film cassettes 201–204 can also be connected to the other motion picture camera 102 without losing cassette data, film data and production-specific data. With each reloading of a film cassette 201–204 with unexposed or partially exposed motion picture film, depending on the equipment of the film cassette, the data can be input directly via an input keypad 23 of the film cassette 201, 202, or, respectively, at the input keypad 13 of the motion picture camera 101, 102, or, respectively, at the input keypad 33 of the electronic data-processing unit 3.

A film cassette 201 to 204 having exposed and/or unexposed motion picture film can thus be operated optionally, while retaining the data assigned to the relevant motion picture film, in conjunction with one or other motion picture camera 101 or 102 or further motion picture cameras that process the same film width. Thus, when the relevant film cassettes 201 to 204 are connected to other motion picture cameras, there is no loss of data in the case of a camera malfunction.

What is claimed is:

1. A motion picture camera cassette system comprising a motion picture camera, a film cassette containing at least one of an exposed and unexposed motion picture film, and an electronic data-processing device, wherein the electronic data-processing device is selectively connectable to at least one of said motion picture camera and film cassette, wherein the film cassette contains a storage device which stores an initial value representing a length of the at least one of exposed and unexposed motion picture film in the film cassette; the motion picture camera has an exchange device which exchanges data with the storage device of the film cassette; the motion picture camera has a detecting device which detects a length of motion picture film exposed by the camera; the camera has a microprocessor which based upon the initial value of the at least one of exposed and unexposed motion picture film in the film cassette and the amount of exposed film detected by the detector calculates a new value representing the length of the at least one of exposed and unexposed motion picture film in the film cassette; and wherein the data-exchange device of the motion-picture camera transmits the new value representing the length of the at least one of exposed and unexposed film in the film cassette into the storage device of the film cassette.

2. The system according to claim 1, further comprising a display device in the motion picture camera; and wherein a value representing the length of at least one of the exposed and unexposed motion picture film of a film cassette is displayable on the display device of the motion picture camera.

3. The system according to claim 1 or 2, further comprising a display device in the film cassette; wherein the value representing the length of at least one of the exposed and unexposed motion picture film of the film cassette is displayable on the display device of the film cassette.

4. The system according to claim 1 wherein the storage device of the film cassette is loadable with a value corresponding to the inserted film length.

5. The system according to claim 1 wherein the storage device of the film cassette is also loadable with data in addition to the value representing the length of at least one of the exposed and unexposed motion picture film.

6. The system of claim 5 wherein the additional data comprises at least one of the group consisting of: a film type, a production number, and a cassette identification mark.

7. The system according to claim 1 wherein the value representing at least one of the exposed and unexposed motion picture film length is input using at least one of an input device of the motion picture camera, an input device of the film cassette and an input device of the electronic data-processing device.

8. The system according to claim 1 wherein the data is exchanged between the motion picture camera and the film cassette via at least one of the group consisting of an electrooptical transmitting device, a magnetic transmitting device, and an electric line connection.

9. The system according to claim 8, wherein the data is exchanged between the motion picture camera and at least one of the film cassette and the electronic data-processing device via an interface present at the motion picture camera.

10. The system according to claim 9 wherein the interface present at the motion picture camera is a time code interface.

11. The system according to claim 9 wherein the interface present at the motion picture camera is a video interface.

12. The system according to claim 1 wherein the at least one of the motion picture camera and the film cassette are connectable to the electronic data processing device via a serial interface.

13. A motion picture camera cassette system comprising:
a film cassette containing at least one of an exposed and unexposed motion picture film and a comprising a storage device;
a motion picture camera comprising,
    a detecting device which detects a length of the motion picture film exposed by the camera,
    a microprocessor which based upon the initial value of the at least one of exposed and unexposed motion picture film in the film cassette and the amount of exposed film detected by the detector calculates a new value representing the length of the at least one of exposed and unexposed motion picture film in the film cassette, and
an exchange device which exchanges data with the storage device of the film cassette; and an electronic data-processing device, wherein the electronic data-processing device is connectable to the motion picture camera, wherein the electronic data-processing device processes data output by the motion picture camera and outputs data to the motion picture camera, wherein the film cassette storage device stores an initial value representing a length of the at least one of exposed and unexposed motion picture film in the film cassette, and wherein the exchange device of the motion-picture camera transmits the new value representing the length of the at least one of exposed and unexposed film in the film cassette into the storage device of the film cassette.

14. The system according to claim 13 wherein the electronic data-processing device is further connectable to the film cassette and wherein the electronic data-processing device processes and displays data output by the motion picture camera and by the film cassette and outputs data to the motion picture camera and to the film cassette.

* * * * *